(12) United States Patent
Marchal et al.

(10) Patent No.: US 11,753,948 B2
(45) Date of Patent: *Sep. 12, 2023

(54) WOVEN FIBROUS PREFORM FOR PRODUCING A COMPOSITE PART, ESPECIALLY A TURBOMACHINE BLADE

(71) Applicant: SAFRAN, Paris (FR)

(72) Inventors: Yann Didier Simon Marchal, Moissy-Cramayel (FR); Dominique Marie Christian Coupe, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/770,537

(22) PCT Filed: Oct. 23, 2020

(86) PCT No.: PCT/FR2020/051923
§ 371 (c)(1),
(2) Date: Apr. 20, 2022

(87) PCT Pub. No.: WO2021/084192
PCT Pub. Date: May 6, 2021

(65) Prior Publication Data
US 2022/0372882 A1    Nov. 24, 2022

(30) Foreign Application Priority Data

Oct. 29, 2019  (FR) ........................................ 1912135

(51) Int. Cl.
*F01D 5/28*     (2006.01)
*B29B 11/16*    (2006.01)
(Continued)

(52) U.S. Cl.
CPC .............. *F01D 5/282* (2013.01); *B29B 11/16* (2013.01); *B29C 70/24* (2013.01); *D03D 1/00* (2013.01);
(Continued)

(58) Field of Classification Search
CPC .......... F01D 5/282; F01D 5/284; B29C 70/24
See application file for complete search history.

(56) References Cited

U.S. PATENT DOCUMENTS

| 8,153,539 | B2* | 4/2012 | Coupe | ................. | B29C 70/24 |
| | | | | | 442/205 |
| 8,505,588 | B2* | 8/2013 | Coupe | ................. | D03D 25/005 |
| | | | | | 139/11 |

(Continued)

FOREIGN PATENT DOCUMENTS

| DE | 10 2011 084472 B3 | 1/2013 |
| WO | WO 2006/136755 | 12/2006 |
| WO | WO 2019/097147 A1 | 5/2019 |

OTHER PUBLICATIONS

International Search Report as issued in International Patent Application No. PCT/FR2020/051923, dated Feb. 17, 2021.

*Primary Examiner* — Michael L Sehn
(74) *Attorney, Agent, or Firm* — Pillsbury Winthrop Shaw Pittman LLP (57) ABSTRACT

A fibrous preform obtained by three-dimensional weaving, comprising a first skin, a second skin, and a central portion connecting them and forming a stiffening element. In a transverse plane, transverse threads of the first skin and the second skin are woven in pairs in the first skin and the second skin on either side of the central portion; the threads of a first pair of the first skin and of a second pair of the second skin are separated into two unitary threads at the central portion by being woven with longitudinal threads, (Continued)

and a thread of the first pair crosses a thread of the second pair at least twice in the central portion.

10 Claims, 5 Drawing Sheets

(51) Int. Cl.
    *B29C 70/24*     (2006.01)
    *D03D 1/00*     (2006.01)
    *D03D 25/00*     (2006.01)

(52) U.S. Cl.
    CPC ..... *D03D 25/005* (2013.01); *F05D 2300/614* (2013.01)

(56) References Cited

U.S. PATENT DOCUMENTS

| | | | |
|---|---|---|---|
| 2013/0216770 A1* | 8/2013 | Gilbertson | D03D 25/005 139/408 |
| 2016/0245103 A1* | 8/2016 | Gimat | F01D 25/005 |

* cited by examiner

WOVEN FIBROUS PREFORM FOR PRODUCING A COMPOSITE PART, ESPECIALLY A TURBOMACHINE BLADE

CROSS-REFERENCE TO RELATED APPLICATIONS

This application is the U.S. National Stage of PCT/FR2020/051923, filed Oct. 23, 2020, which in turn claims priority to French patent application number 1912135 filed Oct. 29, 2019. The content of these applications are incorporated herein by reference in their entireties.

TECHNICAL FIELD

The present invention relates to the general field of composite material parts. More precisely, the invention relates to a fibrous preform for forming a stiffened composite material part, and its application to the manufacture of an aeronautical turbomachine blade.

PRIOR ART

In a known manner, a composite material part can be obtained by producing a fibrous preform and densification of the preform by a matrix. According to the envisaged application, the preform can be made of glass, carbon or ceramic fibres, and the matrix can be made of an organic material (polymer), carbon or ceramic.

For parts with relatively complex shape, it is known to produce a fibrous structure or blank in a single piece by three-dimensional (3D) or multilayer weaving and to shape the fibrous structure in order to obtain a fibrous preform having a shape close to that of the part to be manufactured.

In the field of the manufacture of composite material turbomachine blades, it is continuously sought to increase the mechanical strength of the blade while reducing its mass. Even if it is currently possible to manufacture hollow composite material blades from a fibrous preform woven as a single piece, their stiffness must always be improved, in particular when the blades are inlet or outlet guide blades (IGV or OGV).

Thus, there is always a need for a single-piece fibrous preform which makes it possible to obtain composite material parts combining reduced mass and improved stiffness.

DISCLOSURE OF THE INVENTION

According to an aspect of the invention, this goal is achieved by a fibrous preform intended for forming the fibrous reinforcement of a composite material part with fibrous reinforcement densified by a matrix, the fibrous preform being made as a single piece and obtained by three-dimensional weaving of a plurality of longitudinal threads or strands extending in a direction corresponding to the longitudinal direction of the part with a plurality of transverse threads or strands, the preform comprising a first skin, a second skin and a central portion connecting the first skin to the second skin, the central portion being intended to form a stiffening element of the part in the longitudinal direction, characterised in that, in a transverse plane of the preform:

transverse threads or strands of the first skin and of the second skin are woven in pairs in the first skin and in the second skin on either side of the central portion, the threads or strands of at least a first pair of transverse threads or strands of the first skin are separated into two unitary threads or strands at the central portion, said unitary threads or strands being separately woven with the longitudinal threads or strands in said portion, the threads or strands of at least one second pair of transverse threads or strands of the second skin are separated into two unitary threads or strands at the central portion, said unitary threads or strands being separately woven with the longitudinal threads or strands in said portion, and at least one thread or strand of the first pair and at least one thread or strand of the second pair cross at least twice in the central portion.

Herein, "three-dimensional weaving", "3D weaving" and "multilayer weaving" shall mean a method of weaving by which at least some warp threads (or longitudinal threads) connect weft threads (or transverse threads) over a plurality of weft layers. Such a weaving can be produced on a jacquard loom, in a manner known per se.

The fibrous preform according to the invention has the advantage of being producible in a single weaving step and of having a central portion which will serve, when the preform constitutes the fibrous reinforcement of a composite material part, as stiffening element in a longitudinal direction of the part. The central portion is thus formed from pairs of transverse threads or strands which are split (separated) into unitary threads or strands then woven separately with longitudinal threads or strands which are added at the central portion. Through this weaving mode based on split pairs, the central portion is thus connected by weaving to the skins, which ensures good stability of the assembly. In addition, it is not necessary to insert transverse threads or strands in order to produce the central portion, which simplifies the weaving of the preform. The crossing of longitudinal threads or strands coming from the first and second skin makes it possible to ensure the connection by weaving of the skins with the central portion, while increasing the mechanical strength of the assembly.

In an exemplary embodiment, at least some of the longitudinal threads or strands present in the central portion can have a titre greater than the titre of the longitudinal threads or strands present in the first and second skin. This feature makes it possible to increase the stiffness of the stiffening element which will be formed from the central portion when the preform is densified in order to form a composite material part. For example, the titre of the longitudinal threads or strands in the skins can be less than or equal to 24k, and the titre of the longitudinal threads or strands in the central portion can be greater than or equal to 96k.

In an exemplary embodiment, each of the first and second skin can have, on the opposite side to the central portion, a two-dimensional weaving at the surface. Hence, the surface of the composite material part comprising such a preform will be smoother.

In an exemplary embodiment, the longitudinal threads or strands can be warp threads or strands and the transverse threads or strands can be weft threads or strands.

Another object of the invention is a part made of composite material with fibrous reinforcement densified by a matrix comprising a fibrous preform such as that described above, the part having a first wall and a second wall formed by the first skin and the second skin of the fibrous preform between which extends a stiffening element formed by the central portion of said preform. The stiffening element can absorb the forces exerted on the part by increasing its stiffness.

In an exemplary embodiment, the part can constitute an aeronautical turbomachine blade, the first wall and the second wall corresponding respectively to a pressure face and a suction face of the blade. The blade can in particular constitute an inlet or outlet guide blade of an aeronautical turbomachine. The use of a fibrous preform according to the invention is advantageous for this application because such a blade has structural functions for the engine, between a core thereof and an outer fairing. The stiffening element increases the mechanical strength of the blade under tension and compression. The blade can thus be hollow and comprise two cavities which extend longitudinally on either side of the stiffening element, reducing the mass in comparison to a solid blade.

In an exemplary embodiment, the blade can comprise a pair of central flanges and at least one pair of lateral flanges with at least one longitudinal end, the pair of central flanges being formed from a separation provided in the central portion of the fibrous preform and the pair of lateral flanges being formed by extending the first skin and the second skin of the fibrous preform. Such a separation can be obtained by locally omitting to connect together layers of adjacent thread (in this case longitudinal threads), which enables an unfolding of the portions of fibrous preform adjacent to the separation. This feature makes it possible to obtain a continuity of the fibrous reinforcement of the part up to the fastening flanges of the blade, which increases the reliability and mechanical strength.

In an exemplary embodiment, the blade can comprise an aerodynamic profile element extending transversely between a leading edge and a trailing edge, the leading edge and/or the trailing edge being formed by folding the first or second skin of the fibrous preform over the second or first skin of the fibrous preform. It is thus possible to obtain a leading and/or trailing edge which has a shape which complies with the requirements and a good surface condition. In addition, by producing the leading edge and/or the trailing edge in this way, the risk of opening of the leading and/or trailing edge in the event of an impact or strong vibrations is reduced.

In an exemplary embodiment, a folded end portion of the first or second skin can be housed in a separation provided in the second or in the first skin. It is thus possible to mask the end of the skin which is folded inside the separation provided in the other skin, in order to obtain a good surface condition on the pressure and/or suction face of the blade. Similarly, by producing the leading edge and/or the trailing edge in this way, the risk of opening of the leading and/or trailing edge in the event of an impact or strong vibrations is reduced.

In an exemplary embodiment, the blade can comprise an aerodynamic profile element extending transversely between a leading edge and a trailing edge, the leading edge and/or the trailing edge being formed by a fabric added on the first and second skin of the fibrous preform.

BRIEF DESCRIPTION OF THE DRAWINGS

Other features and advantages of the present invention will become apparent from the description given below, with reference to the appended drawings which illustrate exemplary embodiments that are in no way limiting. In the figures.

DESCRIPTION OF THE EMBODIMENTS

Figure 1:
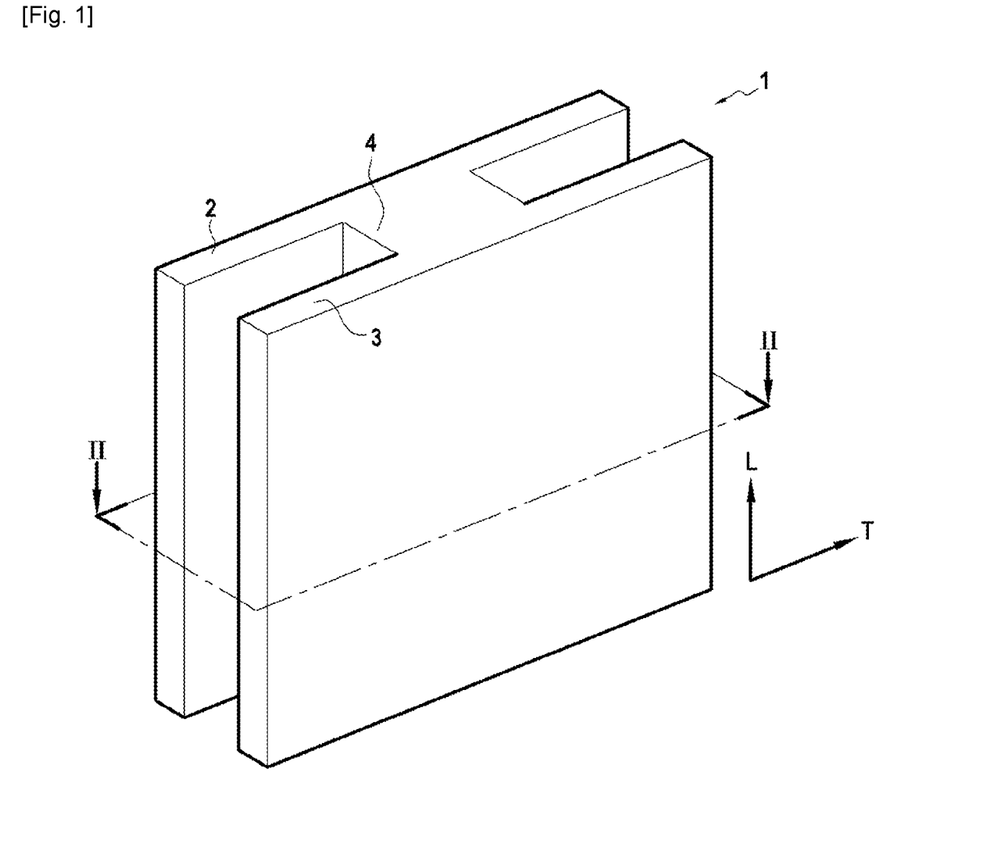
FIG. 1 shows a composite material part according to an embodiment of the invention.

FIG. 1 shows an exemplary composite material part comprising a fibrous reinforcement densified by a matrix, the fibrous reinforcement of which can be obtained from a fibrous preform according to the invention. The part 1 comprises a first wall 2, a second wall 3 and a stiffening element 4 extending between the first wall 2 and the second wall 3. The stiffening element 4 takes the shape of a beam that extends in this case in a longitudinal direction L of the part 1 between the walls 2 and 3. Each wall 2, 3 extends in the longitudinal direction L and in a transverse direction T perpendicular to the longitudinal direction L.

Figure 2:
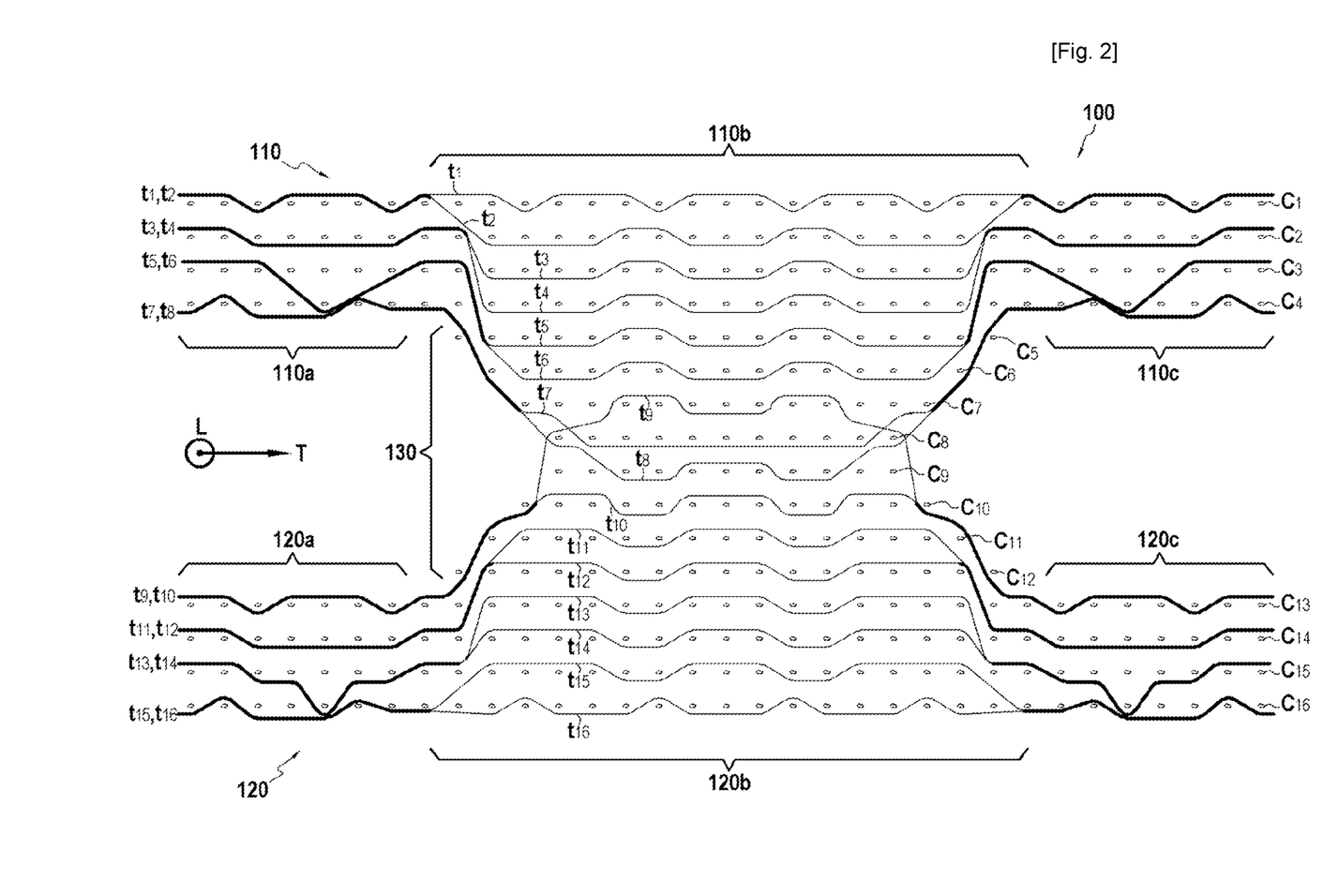
FIG. 2 shows an example of a weave in a transverse plane of a fibrous preform according to an embodiment of the invention.

FIG. 2 shows a cross-sectional view of a fibrous preform 100 according to an embodiment of the invention used for forming the fibrous reinforcement of the part of the FIG. 1. The preform 100 comprises a first skin 110 intended here to form the first wall 2 of the part 1, and a second skin 120 intended to form the second wall 3 of the part 1. The first skin 110 and the second skin 120 are connected by a central portion 130 intended to form the stiffening element 4 of the part 1.

FIG. 2 shows layers $c_1$-$c_{16}$ of warp (longitudinal) threads or strands and the paths of weft (transverse) threads or strands $t_1$-$t_{16}$. For the purposes of simplification, the terms warp thread and weft thread are used in the rest of the description. Thus, FIG. 2 shows a weft plane of the fibrous preform 100. The weft threads connect together warp threads belonging to different layers of warp threads, with the exception of the weft threads which may be present at the surface in order to produce a two-dimensional weaving and the possible presence of local separations between adjacent layers of warp threads. Various 3D or multilayer weaves can be used, such as interlock, multiple satin or multiple plain weaves for example, as described in document WO 2006/136755.

Here, the first skin 110 comprises four layers of warp threads $c_1$-$c_4$, which are connected by weft threads $t_1$-$t_8$. Similarly, the second skin 120 comprises four layers of warp threads $c_{13}$-$c_{16}$, which are connected by weft threads $t_9$-$t_{16}$. The central portion comprises eight layers of warp threads $c_5$-$c_{12}$. It should be noted that in the first skin 110 and in the second skin 120 there are twice as many weft threads as layers of warp threads because the weft threads are woven in pairs in certain parts of the skins 110 and 120.

The first skin 110 can be divided into three portions 110a, 110b and 110c in the transverse direction. The first portion 110a and the third portion 110c constitute free portions of the first skin 110 which are located on either side of the central portion 130. In the first 110a and in the third portion 110c, the weft threads are woven in pairs. Thus, for example, the weft threads $t_1$ and $t_2$ are woven together in the portion 110a and in the portion 110c, in other words they follow the same path. In particular, in the portions 110a and 110c, the weaving can be interlock weaving. It should be noted that on the surface of the first skin 110 opposite the central portion 130, and in portions 110a and 110c, the weaving of the weft threads $t_1$ and $t_2$ is two-dimensional so as to give the composite material part a smooth surface.

Similarly, the second skin 120 can be divided into three portions 120a, 120b and 120c in the transverse direction T. The first portion 120a and the third portion 120c constitute free portions of the second skin 120 which are located on either side of the central portion 130. In the first portion 120a and in the third portion 120c, the weft threads are woven in pairs. Thus, for example, the weft threads $t_{15}$ and $t_{16}$ are woven together in the portion 120a and in the portion 120c, in other words they follow the same path. In particular, in the portions 120a and 120c, the weaving can be interlock weaving. It should be noted that on the surface of the second skin 120 opposite the central portion 130, and in portions 120a and 120c, the weaving of the weft threads $t_{15}$ and $t_{16}$ is two-dimensional so as to give the composite material part a smooth surface.

In the illustrated example, the weft threads of each pair of weft threads $t_1$-$t_2$, $t_3$-$t_4$, $t_5$-$t_6$ and $t_7$-$t_8$ are separated into two unitary threads at the central portion 130, and in general on either side thereof. Once separated, the unitary threads are woven separately with the warp threads in the portion 110b and in the central portion 130. The term "separately woven" shall mean that the threads no longer follow the same path. The separation of the pairs (or splitting of the pairs) thus makes it possible to double the number of weft threads available at the central portion in order to weave the latter with additional warp thread layers. Hence, the weft threads $t_1$ to $t_4$ are woven with warp thread layers $c_1$ to $c_4$ in the portion 110b of the first skin 110, whereas the weft threads $t_5$ to $t_8$ are woven respectively with the warp threads layers $c_5$, $c_6$, $c_8$ and $c_9$ in the central portion 130. Some of the unitary weft threads of the first skin 110 are woven with the warp thread layers of the first skin 110, and another portion of the unitary weft threads of the first skin 110 are woven with the warp thread layers of the central portion 130.

In the illustrated example, the weft threads of each pair of weft threads $t_9$-$t_{10}$, $t_{11}$-$t_{12}$, $t_{13}$-$t_{14}$ and $t_{15}$-$t_{16}$ are separated into two unitary threads at the central portion 130, and in general on either side thereof. Once separated, the unitary threads are woven separately with the warp threads in the portion 120b and in the central portion 130. Hence, the weft threads $t_{13}$ to $t_{16}$ are woven with warp thread layers $c_{13}$ to $c_{16}$ in the portion 120b of the second skin 120, whereas the weft threads $t_9$ to $t_{12}$ are woven respectively with the warp threads layers $c_7$, $c_{10}$ to $c_{12}$ in the central portion. Some of the unitary weft threads of the second skin 120 are woven with the warp thread layers of the second skin 120, and another portion of the unitary weft threads of the second skin 120 are woven with the warp thread layers of the central portion 130.

In the illustrated example, the unitary weft threads obtained by splitting pairs of weft threads are each woven with a different single warp thread layer in the portions 110b and 120b and in the central portion 130.

In the illustrated example, the unitary weft threads $t_7$ and $t_8$ coming from the first portion 110 cross the weft thread $t_9$ coming from the second portion 120 in the central portion 130. Here, this crossing enables the warp thread layers $c_7$, $c_8$ and $c_9$ to be connected to the first skin 110 by the weft threads $t_7$ and $t_8$, and to the second skin 120 by the weft thread $t_9$. Of course, other weaves can be envisaged keeping the crossing, at least twice, of weft threads coming from the first 110 and from the second 120 skin in the central portion 130 in order to ensure the cohesion of the preform 100. Hence, in this example, only some of the unitary weft threads coming from the first skin 110 cross only some of the unitary weft threads coming from the second skin 120; the other unitary weft threads being woven with different warp thread layers without crossing one another.

In the illustrated example, there are four warp threads per column in the first skin 110 and in the second skin 120, i.e. eight threads per column at the free portions 110a, 120a, 110c, 120c of the skins. The number of warp threads of a given warp column is progressively increased here in order to attain 16 warp threads per column in the preform at the central portion 130. In this example, the weft threads of the pairs of weft threads are separated at different warp columns, in other words at different locations in the transverse direction T, this enables a gradual introduction of the new warp threads and easier weaving.

It can be advantageous that the titre (i.e. the average number of filaments constituting the threads) of the warp threads of the layers $c_5$ to $c_{12}$ in the central portion 130 is greater than the titre of the warp threads of the layers $c_1$ to $c_4$ and $c_{13}$ to $c_{16}$ in the skin 110 and 120, in order to increase the stiffening function of the central portion 130 in a composite material part.

Figure 3:
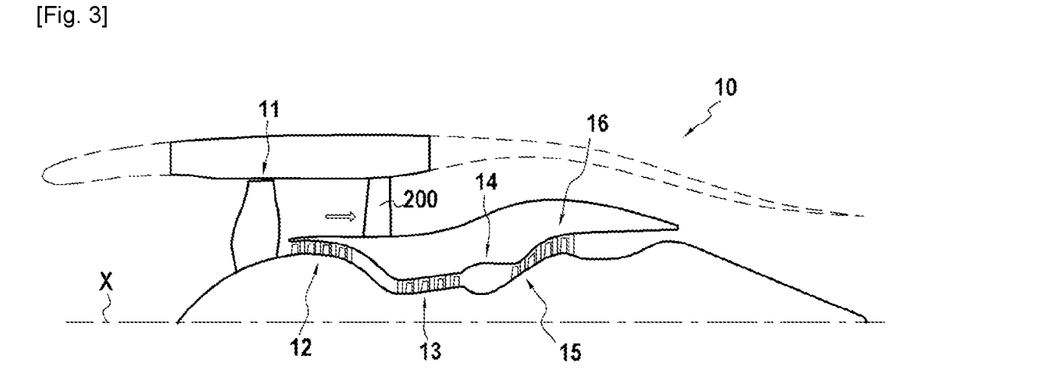
FIG. 3 is a highly schematic view in longitudinal section of an aeronautical turbomachine.

FIG. 3 shows a schematic view in the longitudinal cross-section of a turbofan engine 10 centred on the axis X. It includes, from upstream to downstream: a fan 11, a low-pressure compressor 12, a high-pressure compressor 13, a combustion chamber 14, a high pressure turbine 15 and a low pressure turbine 16. At the inlet to the turbofan engine 10, the air stream entering the fan 11 is divided into a primary stream or hot stream, and a secondary stream or cold stream. The flow channel of the secondary stream conventionally comprises a flow straightener provided with outlet guide blades 200 (or OGV for Outlet Guide Vanes) arranged downstream of the fan 11, which have, in particular, the function of straightening the cold stream at the outlet of the fan 11 in order to derive the maximum thrust from it. The blades 200 also have a structural function and must, in particular, be capable of supporting forces exerted by the engine in operation or an impact due to the intake of an object by the fan 11, or even the detachment of a blade of the fan 11. Hence, these blades 200 must both have satisfactory mechanical properties while being sufficiently light to improve the propulsive efficiency of the engine.

An example of use of a preform 100 according to an embodiment of the invention for manufacturing an aeronautical turbomachine blade made of composite material, in particular an outlet guide blade 200, will now be described with reference to FIGS. 4 to 9.

Figure 4:
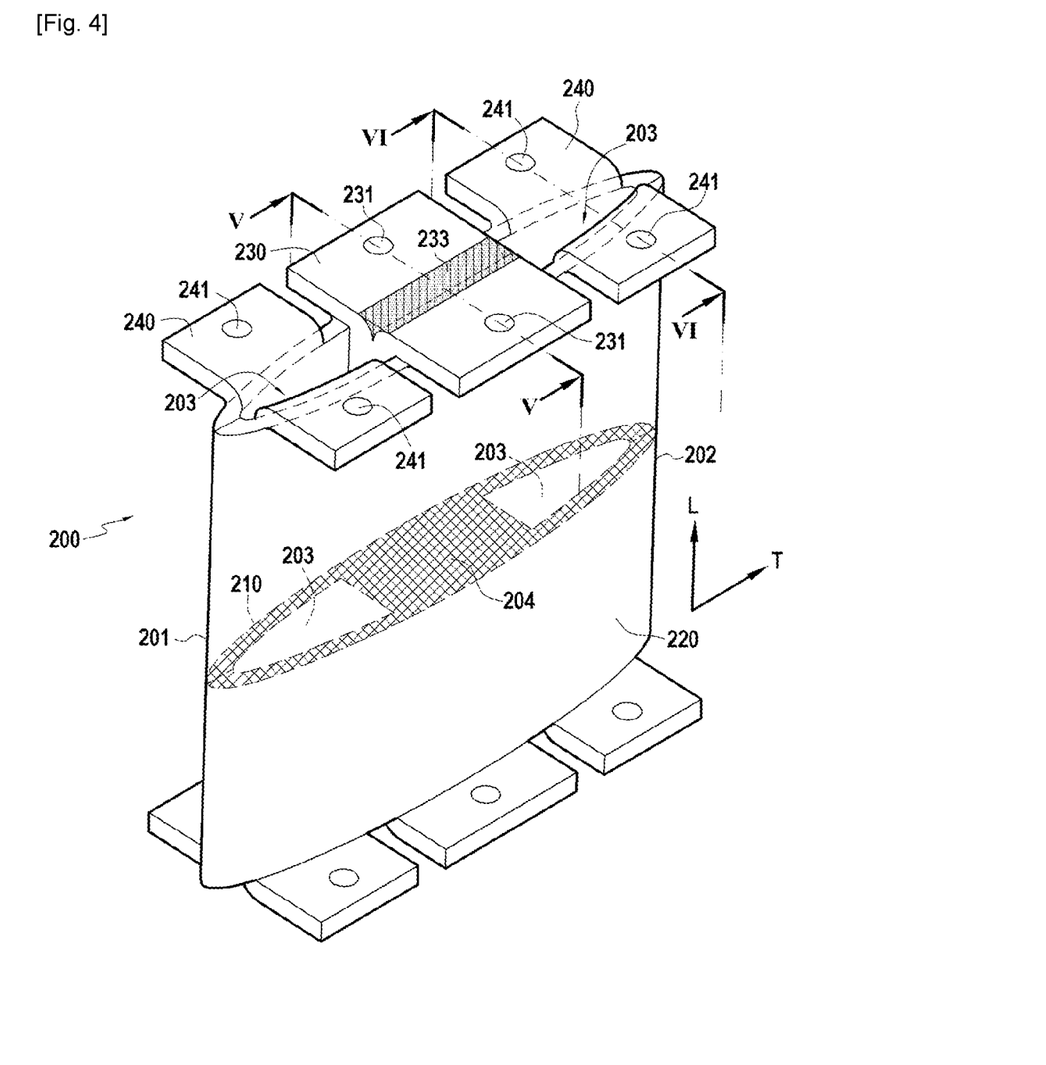
FIG. 4 is a schematic view of a blade as inlet guide blade of an aeronautical turbomachine.

FIG. 4 shows, in a highly schematic manner, an outlet guide blade 200 of an aeronautical turbomachine. The blade 200 extends in the longitudinal direction L, and in the transverse direction T between a leading edge 201 and a trailing edge 202. In addition, it has a pressure face 210 and a suction face 220. At each of its longitudinal ends, the blade 200 has a pair of central flanges 230 and two pairs of lateral flanges 240 which enable its fastening in the engine by means of fastening holes 231, 241. The blade 200 is hollow and comprises two longitudinal cavities 203 opening at each longitudinal end of the blade 200. The longitudinal cavities are separated by a stiffening element 204 which extends between the pressure 210 and suction 220 faces in the longitudinal direction L.

The blade 200 is made of composite material with fibrous reinforcement densified by a matrix. The fibrous reinforcement of the blade 200 (illustrated in a section at half-height on the blade 200 of FIG. 4) is obtained in this case from a fibrous preform 100 such as that illustrated in FIG. 2. In particular, the first 110 and the second 120 skins of the fibrous preform 100 form the pressure and suction faces of the blade 200, and the central portion 130 of the preform 100 forms the stiffening element 204. The skins 110 and 120 of the fibrous preform 100 are joined at their free ends in order to form the edges of the blade 200.

Figure 5:
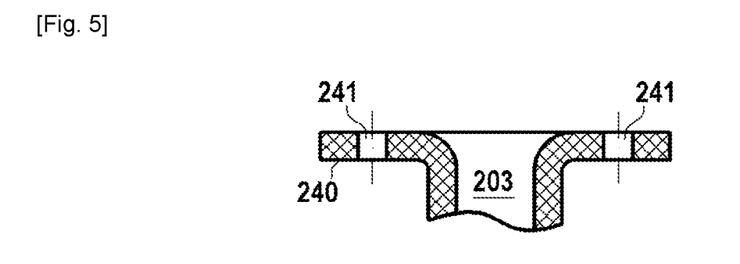
FIG. 5 shows a longitudinal sectional view of the blade of FIG. 4 at one of its fastening flanges.

FIG. 5 shows a longitudinal sectional view of the fibrous reinforcement of the blade 200 at the pair of central flanges 230. It can be seen that the fibrous reinforcement is continuous between the stiffening element 204 and the ends of the flanges of the pair of flanges 230. The pair of central flanges 230 is more specifically obtained from a separation 232 provided in the fibrous preform 100 during its weaving. In order to obtain such a separation, the weaving together of layers of longitudinal threads by transverse threads has been intentionally omitted, so that the preform can be unfolded. In order to fill the space created by the unfolding of the separated portions of the fibrous preform, an insert 233 can be placed in the separation 232.

Figure 6:
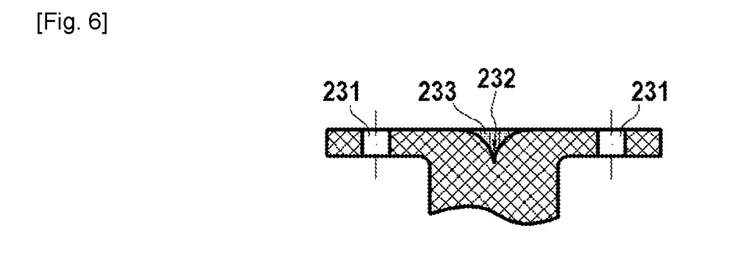
FIG. 6 shows a longitudinal sectional view of the blade of FIG. 4 at another of its fastening flanges.

FIG. 6 shows a longitudinal sectional view of the fibrous reinforcement of the blade 200 at a pair of lateral flanges 240. It can be seen that the fibrous reinforcement is continuous between the pressure and suction faces, and the ends of the flanges of the pair of flanges 240. The pair of lateral flanges 240 is more specifically obtained by extending the first 110 and second 120 skin of the fibrous preform 100 and unfolding these beyond the end of the blade 200.

Figure 7:
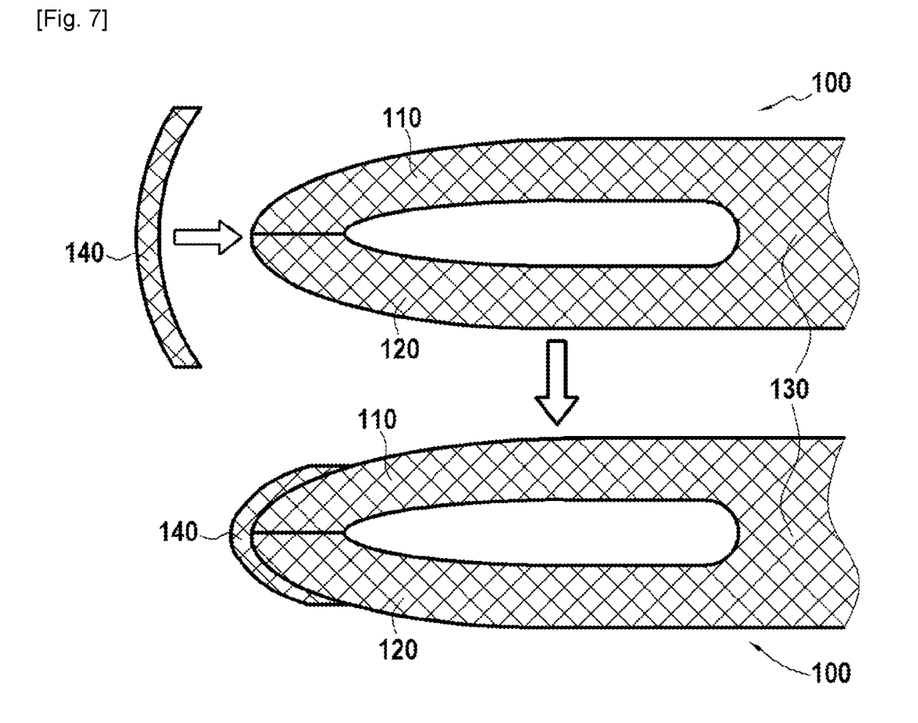
FIG. 7 shows a first manner of forming a leading edge or a trailing edge of an aeronautical turbomachine blade from a fibrous preform according to various embodiments of the invention.
Figure 8:
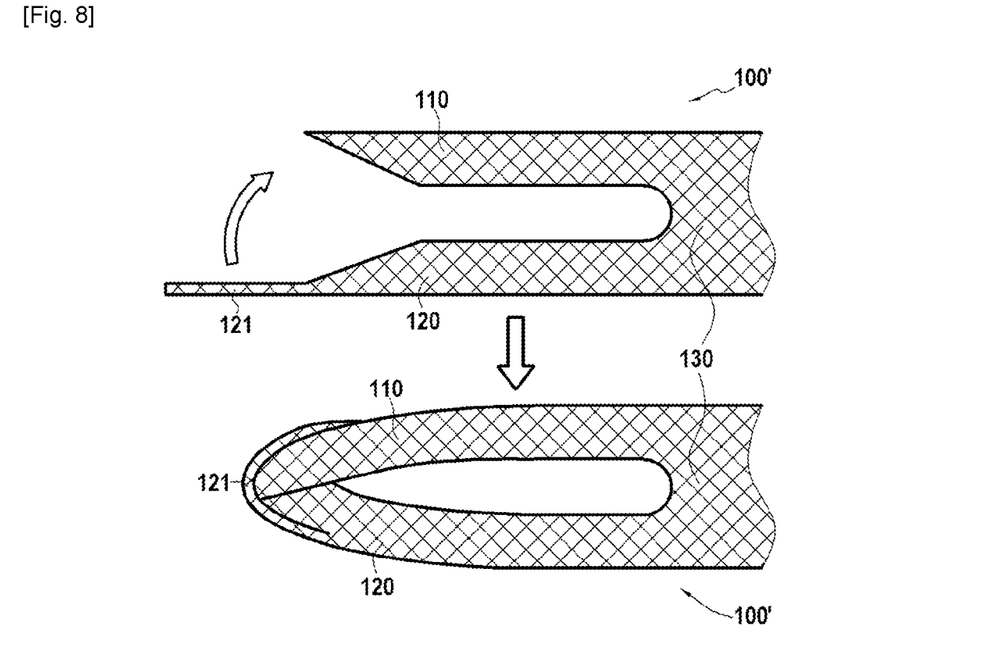
FIG. 8 shows a second manner of forming a leading edge or a trailing edge of an aeronautical turbomachine blade from a fibrous preform according to various embodiments of the invention.
Figure 9:
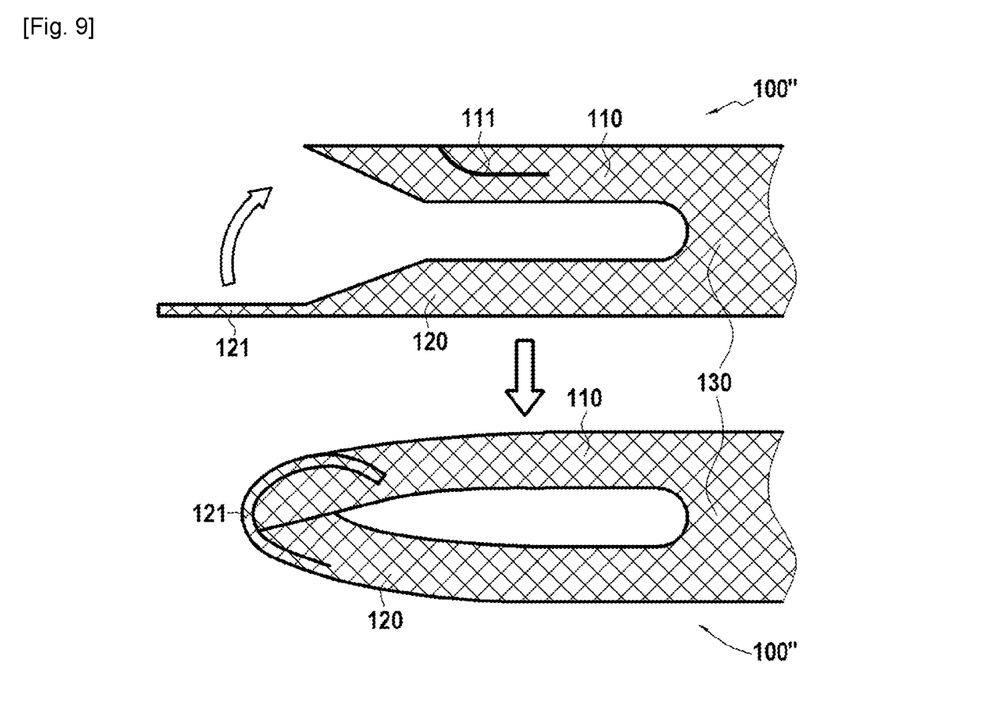
FIG. 9 shows a first manner of forming a leading edge or a trailing edge of an aeronautical turbomachine blade from a fibrous preform according to various embodiments of the invention.

FIGS. 7 to 9 show various ways of forming the leading edge 201 or the trailing edge 202 of the blade 200 from fibrous preforms according to various embodiments of the invention. FIGS. 7 to 9 schematically show cross-sections of fibrous preforms.

In the embodiment illustrated in FIG. 7, the fibrous preform 100 that is used is similar to that illustrated in FIG. 2. In order to form the edge of the blade 200, a fabric 140 is added on the joined ends of the first 110 and second 120 skins.

In the embodiment illustrated in FIG. 8, the fibrous preform 100' that is used still comprises a first skin 110 and a second skin 120, as for the preform 100 of FIG. 2. The second skin 120 has, on the side of the edge to be formed, a greater length in the transverse direction than the first skin 110. The portion 121 of the second skin 120 which extends beyond the first skin can have a two-dimensional weaving, of plain weave type for example. In order to form the edge, the portion 121 of the second skin 120 is folded over the first skin 110 in order to cover the boundary between the two skins 110 and 120.

In the embodiment illustrated in FIG. 9, the fibrous preform 100" is similar to the fibrous preform 100' in that the second skin 120 has a portion 121 which extends beyond the first skin 110 in the transverse direction. The portion 121 can have a two-dimensional weaving, of plain weave type for example. In addition, the first skin 110 in this case includes a separation 111 opening onto the surface and extends in the transverse direction to the inside of the first skin 110. In order to form the edge, the portion 121 of the second skin 120 is folded over the first skin 110 and the portion 121 is inserted inside the separation 111. Hence, the end of the portion 121 is housed in the first skin 110 which gives a more regular surface condition to the face of the blade 200 which will be formed by the first skin 110.

It should be noted that it is possible to cover the leading edge 201 of the blade 200 with a metal foil in order to increase the solidity of the blade 200 in case of impact with an object.

In general, the fibres of the fibrous preform are made of a material chosen according to the envisaged application, for example made of glass, carbon or ceramic.

The densification of the fibrous preform by a matrix in order to obtain a composite material part is carried out by holding the preform in a shaping tool at least until the preform is rigid (or strengthened). Inflatable bladders can be used in order to form the hollow portions in the part and to prevent their being filled by a matrix. In particular, inflatable bladders can be used in order to form the hollow portions 203 of the blade 200.

The nature of the matrix is chosen according to the envisaged application, for example an organic matrix obtained, in particular, from a polymer matrix precursor resin such as an epoxy, bismaleimide or polyimide resin, or a carbon matrix or ceramic matrix.

In the case of an organic matrix, the fibrous preform is impregnated by a composition containing the matrix precursor resin, before shaping in a tool, or after shaping, the impregnation in the latter case being carried out, for example, by infusion or a resin transfer moulding (RTM) method, in a suitable mould. In the case of a carbon or ceramic matrix, the densification can be carried out through chemical vapour infiltration (CVI) or through impregnation by a liquid composition containing a carbon or ceramic precursor resin and heat treatment for pyrolysis or ceramisation of the precursor, these methods being known per se.

The invention claimed is:

1. A fibrous preform for forming a fibrous reinforcement of a composite material part with the fibrous reinforcement densified by a matrix, the fibrous preform being made as a single piece and obtained by three-dimensional weaving of a plurality of longitudinal threads or strands, extending in a direction corresponding to the longitudinal direction of the part with a plurality of transverse threads or strands, the preform comprising a first skin, a second skin and a central portion connecting the first skin to the second skin, the central portion being intended to form a stiffening element of the part in the longitudinal direction, wherein, in a transverse plane of the preform:
   transverse threads or strands of the first skin and of the second skin are woven in pairs in the first skin and in the second skin on either side of the central portion,
   the threads or strands of at least a first pair of transverse threads or strands of the first skin are separated into two unitary threads or strands at the central portion, said unitary threads or strands being separately woven with the longitudinal threads or strands in said central portion,
   the threads or strands of at least one second pair of transverse threads or strands of the second skin are separated into two unitary threads or strands at the central portion, said unitary threads or strands being separately woven with the longitudinal threads or strands in said central portion, and at least one thread or strand of the first pair and at least one thread or strand of the second pair cross at least twice in the central portion.

2. The fibrous preform according to claim 1, wherein at least some of the longitudinal threads or strands present in the central portion have a titre greater than the titre of the longitudinal threads or strands present in the first and second skins.

3. The fibrous preform according to claim 1, wherein each of the first and second skin have, on an opposite side to the central portion, a two-dimensional weaving at the surface.

4. The fibrous preform according to claim 1, wherein the longitudinal threads or strands are warp threads or strands and the transverse threads or strands are weft threads or strands.

5. A part made of composite material with fibrous reinforcement densified by a matrix comprising the fibrous preform according to claims 1, the part having a first wall and a second wall formed by the first skin and the second skin of the fibrous preform between which extends the stiffening element formed by the central portion of said preform.

6. The part according to claim 5, constituting an aeronautical turbomachine blade, the first wall and the second wall corresponding respectively to a pressure face and a suction face of the blade.

7. The part according to claim 6, comprising a pair of central flanges and at least one pair of lateral flanges with at least one longitudinal end, the pair of central flanges being formed from a separation provided in the central portion of the fibrous preform and the pair of lateral flanges being formed by extending the first skin and the second skin of the fibrous preform.

8. The part according to claim 6, comprising an aerodynamic profile element extending transversely between a leading edge and a trailing edge, the leading edge and/or the trailing edge being formed by folding the first or second skin of the fibrous preform over the second or first skin, respectively, of the fibrous preform.

9. The part according to claim 8, wherein a folded end portion of the first or second skin is housed in a separation provided respectively in the second or in the first skin.

10. The part according to claim 6, comprising an aerodynamic profile element extending transversely between a leading edge and a trailing edge, the leading edge and/or the trailing edge being formed by a fabric added on the first and second skins of the fibrous preform.

* * * * *